US006411937B1

(12) United States Patent
Brusseaux

(10) Patent No.: US 6,411,937 B1
(45) Date of Patent: Jun. 25, 2002

(54) TERMINAL FOR COMMUNICATION IN AN URBAN ENVIRONMENT

(75) Inventor: Thierry Brusseaux, Avenay (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/333,220

(22) Filed: Jun. 15, 1999

(30) Foreign Application Priority Data

Jun. 19, 1998 (FR) .............................................. 98 07805

(51) Int. Cl.[7] .............................................. G06F 17/60
(52) U.S. Cl. ........................ 705/21; 705/16; 340/932.2
(58) Field of Search ..................... 705/16, 21; 701/208, 701/209, 210; 340/932.2, 5.9; 194/205, 900

(56) References Cited

U.S. PATENT DOCUMENTS

| 3,688,276 A | * | 8/1972 | Quinn | |
| 4,379,334 A | * | 4/1983 | Feagins, Jr. et al. | |
| 4,876,540 A | * | 10/1989 | Berthon et al. | 340/932.2 |
| 5,029,094 A | * | 7/1991 | Wong | 340/932.2 |
| 5,266,947 A | * | 11/1993 | Fujiwara et al. | 340/932.2 |
| 5,339,000 A | * | 8/1994 | Bashan et al. | 340/932.2 |
| 5,472,116 A | | 12/1995 | Barbe et al. | |
| 5,742,229 A | | 4/1998 | Smith | |
| 5,940,481 A | * | 8/1999 | Zeitman | 340/932.2 |
| 6,037,880 A | * | 3/2000 | Manion | 340/932.2 |

FOREIGN PATENT DOCUMENTS

| DE | 29708833 U | * | 7/1997 | |
| FR | 2532805 | | 3/1984 | |
| GB | 2170637 A | * | 3/1983 | |
| JP | 02195493 A | * | 8/1990 | |
| WO | WO 94/20330 | | 9/1994 | |
| WO | WO 94/27258 | | 11/1994 | |
| WO | WO 97/37328 | | 10/1997 | |

OTHER PUBLICATIONS

VenTek International, Inc., VenTek's Next Parking Meter Unveiled at IPI 2001, Jun. 4, 2001.*
Hudsons Bay Co, Bridal Systems Upgrade, Chain Store Age Executive, vol. 69, No. 10 (Oct. 1993), pp. 106–108.*
Schulumberger Electronic Transactions Product Group Urban Terminals & Systems Division, M2 Presswire, (Oct. 711, 1995), 918 words.*
Walsby, T., Who Said Wireless Wouldn't Catch On, Parking News, No. 161 (1997), pp. 12–3.*
Holbrook, Michael E., Wireless Parking Systems: Technology Hits The Streets Bringing Municipalities Increased Revenue, Service and Operating Efficiencies, Traffic Technolgy International, Annual Review, (1998), pp. 213–216.*

* cited by examiner

Primary Examiner—Kenneth R. Rice
Assistant Examiner—Lynda Jasmin
(74) Attorney, Agent, or Firm—Frishauf, Holtz, Goodman, Langer & Chick, P.C.

(57) ABSTRACT

A communications terminal for communicating in an urban environment. The communications terminal includes a parking meter with a printer and a payment device. The terminal also is provided with a CPU, a modem for communicating with at least one information server, and a user interface for selecting information.

9 Claims, 1 Drawing Sheet

TERMINAL FOR COMMUNICATION IN AN URBAN ENVIRONMENT

The present invention relates to a terminal for communication in an urban environment. A particularly advantageous application of the invention lies in the field of services that a local authority can provide for visitors.

BACKGROUND OF THE INVENTION

Any person visiting a town generally needs to have information which is either municipal information or commercial information.

By way of example, "municipal" information can be a street map of the town, the route to be followed to go to a given location, the public transport network, the locations of sites to be visited, museums, cinemas, theaters, etc.

"Commercial" information relates to advertising enabling businesses and services in the town to make themselves known to visitors. Conversely, it can also be advantageous for the same visitors to have the option, on arrival, of making hotel, restaurant, taxi, etc. reservations directly.

Unfortunately, apart from a few town or district plans accompanied by a small amount of tourist or publicity information, urban environments do not at present have genuine interactive communications means giving visitors easy and fast access to the services they require.

SUMMARY OF THE INVENTION

An object of the present invention is to provide a communications terminal for communicating in an urban-environment and suitable for providing the above-mentioned municipal and commercial information in a manner that is simple for the user, low in cost for the municipality, and capable of being organized in a network of terminals that has a relatively high geographic density so that such a terminal is easily and conveniently accessible to the users.

These and other objects are attained in accordance with one aspect of the present invention which is directed to a communications terminal for communicating in an urban environment which includes a parking meter having print means and payment means. The terminal also includes a CPU, means for communicating with at least one information server, and an interface for selecting information.

The invention thus makes it simple to provide a terminal for communication in an urban environment by combining functions associated with a parking meter proper, i.e. paying for parking, and functions associated with communicating information. Any town that is fitted with or that is going to be fitted with parking meters can thus easily and without significant extra cost provide itself with means for providing access to the above-mentioned municipal and commercial information without needing to develop a special terminal dedicated to communicating with a server of such information. In addition, using parking meters as terminals for communicating information is particularly apt since they are to be found in large numbers in zones where-parking needs to be paid for, i.e. mainly in town centers, specifically where the need for information is the greatest. Finally, the terminal of the invention benefits from the same protection against the weather and vandalism as does a parking meter.

An advantage of the communications terminal of the invention is that any visitor arriving by car in a town must start by parking the car, and will naturally go to such a parking meter. Thus, while paying for parking, the visitor will also be given the option of accessing any information of interest.

Another advantage of the invention is that since a parking meter by construction already possesses means for printing out a "pay-and-display" ticket, the same print means can also be used to provide the user with information on paper, such as a route, timetables for public transport, etc. It is also possible for businesses to use the terminal of the invention to issue cut-price offers for use in certain stores, shows, etc., so as to attract the potential clientele constituted by the users of parking meters.

Similarly, a parking meter has means for effecting payment, in particular by means of a card, so it is possible to devise uses of a communications terminal of the invention in supplying paid-for services, such as directly reserving a ticket for a show or a hotel room.

It will be understood that another advantage of the invention lies not only in its ability to be installed with new parking meters, but that it can also be retrofitted to meters that are already installed, with the information-and-communication function being obtained by adding the necessary equipment, namely the CPU, the communications means, and the selection interface.

BRIEF DESCRIPTION OF THE DRAWING

The following description referring to the accompanying drawing is given by way of non-limiting example and serves to facilitate understanding the invention and how it can be implemented.

DETAILED DESCRIPTION OF THE INVENTION

Figure 1:
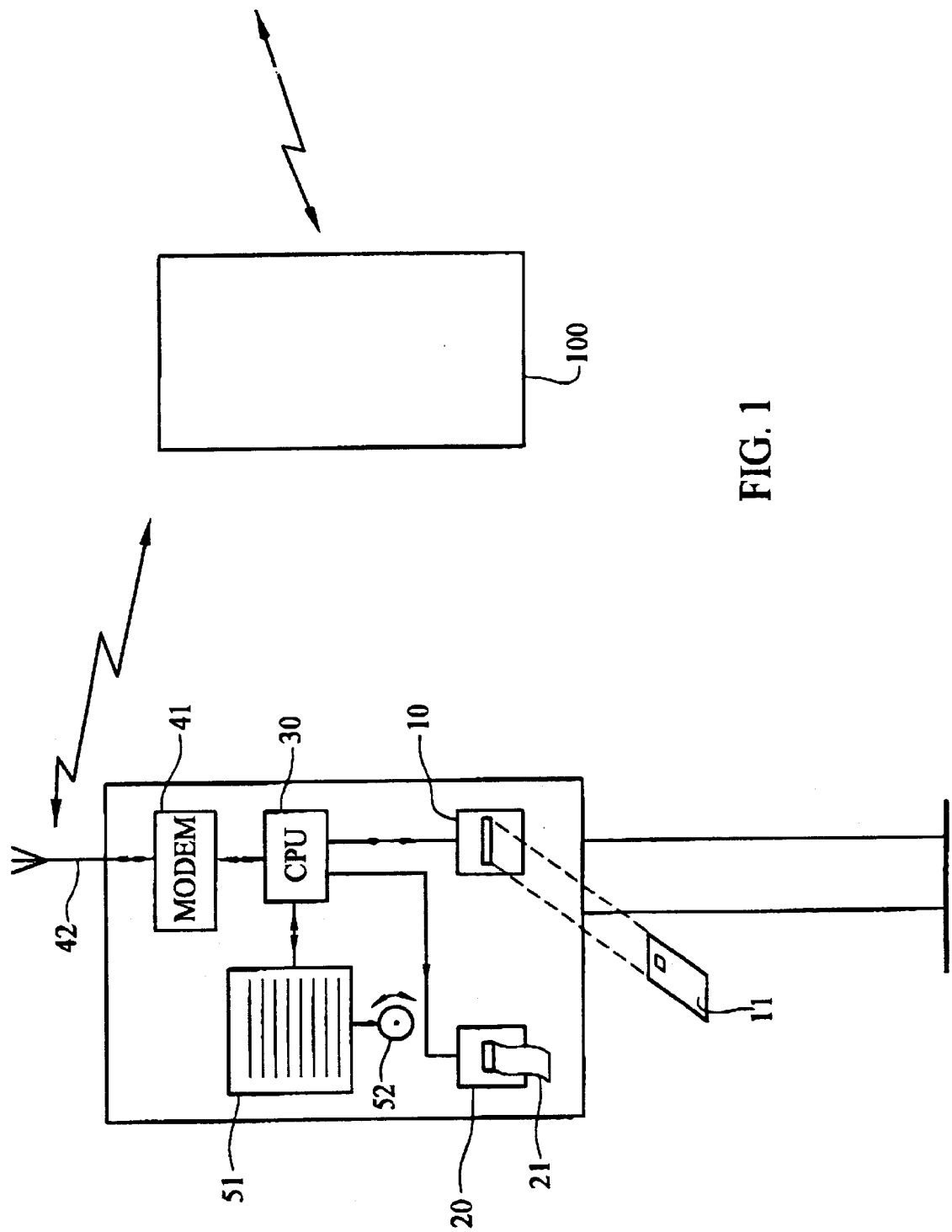
FIG. 1 is a schematic front view of a communications terminal of the invention.

FIG. 1 shows a communications terminal for communicating in an urban environment, which includes a parking meter used for paying for car parking. It has means for performing the functions essential to such a parking meter, i.e. Moans for receiving payment, in this case a reader 10 for electronic memory cards 11, and printer means 20, specifically for printing "pay-and-display" parking tickets 21.

In order to enable the parking meter to be used-also as part of a communications terminal, it is coupled to other components such as a CPU 30 of the personal computer type, means for communicating with an information server 100, namely a modem 41 and an antenna 42, and a user interface comprising a display screen 51 and a device enabling information that is displayed on the screen 51 to be selected, such as a knob 52 of the type described in U.S. Pat. No. 5,472,116, the contents of which are hereby incorporated by reference, but which could also be a set of touch-sensitive keys disposed on the screen 51.

When a person desires to park in a zone in which parking must be paid for, the person goes to a parking meter, pays for a selected period of parking time by means of a payment card 11 or in cash, and receives a "pay-and-display" ticket 21 issued by the print means 20. With a parking meter that operates as a communications terminal, the same person, or user, prior to returning to the vehicle for the purpose of placing the ticket 21 in the windshield so it is visible there, can gain access to various kinds of information as displayed on the screen 51. By means of the knob 52, the user can select information of interest. In particular, the driver can consult a street map of the town, can be given a route, can find out about public transport, shows, hotels, restaurants, etc. All of this information is displayed on the screen and can optionally be delivered on paper by the printer means 20 provided in the parking meter.

The user can also perform operations that require payment, such as booking and paying for a hotel bedroom directly from the terminal. For this purpose, the user needs a payment card, e.g. a bank card, which is used in combination with the card reader 10 of the parking meter.

In general, the information available on the terminal can be input either directly to the server 100, or the server can look for the information in other servers that are already in a existence, such as a town website, a tourist office website, etc. The information is then downloaded to the terminal in a well known manner. It is also possible for such a terminal to operate completely on-line, being permanently connected to the server 100 or to a website. However, since access times and call costs are then greater, it is preferable for the terminal to operate off-line, not being connected on a continuous basis, but having the information which is stored therein updated regularly. Nevertheless, on-line connection is necessary whenever a smartcard-based financial transaction is to be performed.

What is claimed is:

1. A communications terminal, comprising:

a parking meter having
     printer means,
     payment receiving means,
     display means,
     user interface means, and
     control means, responsive to at least one of (i) a payment made by a user into said payment receiving means, and (ii) selections made by the user via said user interface means, to control said printer means to print a ticket for indicating a period of permitted parking;
   communication means for communicating with a remote source of information,
   means, including said user interface means, to designate information to be accessed in the remote source of information via said communication means,
   means, including said display means, to display said accessed information, and
   means, including said printer means, to print out said accessed information.

2. A communications terminal according to claim 1, wherein said user interface means for selecting information comprises a display screen and a device for selecting information displayed on said display screen.

3. A communications terminal according to claim 2, wherein said selection device is a knob.

4. A communications terminal according to claim 2, wherein said selection device is a plurality of touch-sensitive keys disposed on the display screen.

5. A communications terminal according to claim 1, wherein said terminal operates on-line, being permanently connected to said server.

6. A communications terminal according to claim 1, wherein said terminal operates off-line, not being permanently connected to said server.

7. A communications terminal, comprising:

a parking meter having
     printer means,
     payment receiving means,
     user interface means, and
     control means, responsive to at least one of (i) a payment made by a user into said payment receiving means, and (ii) selections made by the user via said user interface means, to control said printer means to print a ticket for indicating a period of permitted parking;
   communication means for communicating with a remote source of information,
   means to designate information to be accessed in the remote source of information via said communication means,
   display means to display said accessed information, and
   means, including said printer means, to print out said accessed information.

8. A communications terminal, comprising:

a parking meter having
     printer means,
     payment receiving means,
     display means, and
     control means, responsive to a payment made by a user into said payment receiving means, to control said printer means to print a ticket for indicating a period of permitted parking;
   communication means for communicating with a remote source of information,
   user interface means to designate information to be accessed in the remote source of information via said communication means,
   means, including said display means, to display said accessed information, and
   means, including said printer means, to print out said accessed information.

9. A communications terminal, comprising:

a parking meter having
     printer means,
     payment receiving means, and
     control means, responsive to a payment made by a user into said payment receiving means, to control said printer means to print a ticket for indicating a period of permitted parking;
   communication means for communicating with a remote source of information,
   user interface means to designate information to be accessed in the remote source of information via said communication means,
   display means to display said accessed information, and
   means, including said printer means, to print out said accessed information.

* * * * *